United States Patent

Wiegand

[15] 3,698,424

[45] Oct. 17, 1972

[54] PRESSURE CONTROL VALVE

[72] Inventor: Charles W. Wiegand, 18 Circuit Road, New Rochelle, N.Y. 10805

[22] Filed: Sept. 28, 1970

[21] Appl. No.: 76,011

[52] U.S. Cl. .................................. 137/467, 137/69
[51] Int. Cl. ............................................. F16k 17/00
[58] Field of Search ........................... 137/69, 467

[56] References Cited

UNITED STATES PATENTS

| | | | |
|---|---|---|---|
| 3,229,713 | 1/1966 | Wiegand | 137/467 |
| 2,154,827 | 4/1939 | Wangenheim | 137/69 |
| 1,874,356 | 8/1932 | Rowley | 137/69 |

*Primary Examiner*—Harold W. Weakley

[57] ABSTRACT

A valve operable to open when a predetermined fluid pressure value is applied comprising a valve body having a passage way, a closure member for controlling the flow, a control spring initially shouldered on a fixed abutment, a pendulant type member operatively pivoted to the shouldered end of the spring with the free end of the pendulant engaging a convexed surface on the closure member initially at a point tangential to its axis, a pressure responsive means when pressurized engages the free end of the pendulant urging it toward the axis of the closure member and by cam action raising the spring from its abutment thereby loading the closure member. When a predetermined pressure value is reached, the free end of the pendulant is pushed by the pressure responsive means beyond the axis of the closure member returning the spring to its fixed abutment and concurrently releasing the spring force on the closure member permitting the valve to open.

The valve may include a main spring to initially load the closure member. The cam action of the pendulant on the control spring would furnish a supplemental force on either the valve stem or the main spring and release this force when a predetermined pressure value is reached, returning the control to the main spring in the valve.

4 Claims, 6 Drawing Figures

INVENTOR
Charles W. Wiegand.

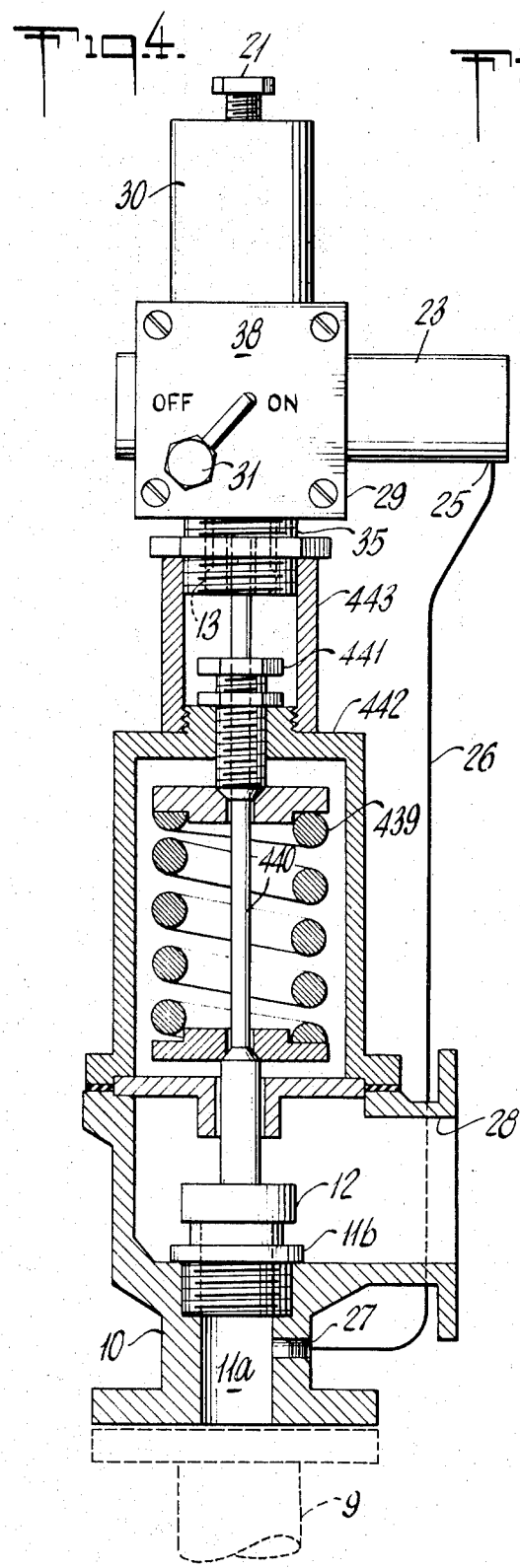
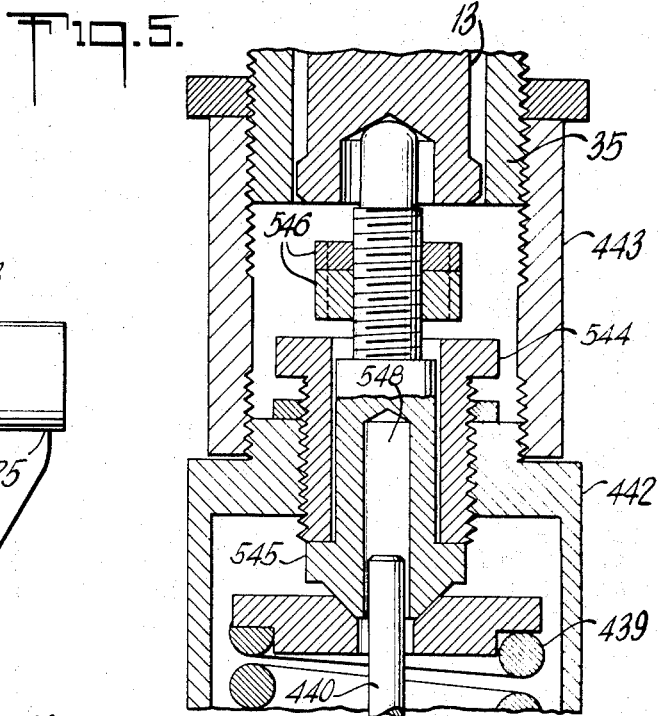
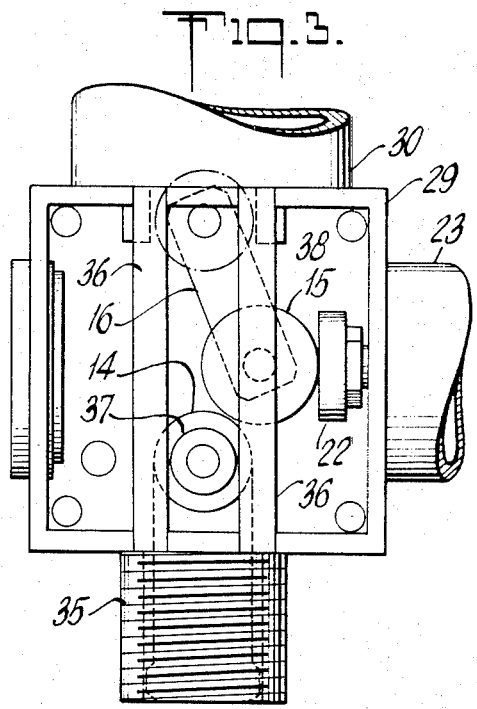

PRESSURE CONTROL VALVE

This invention relates to the pressure relieving devices used to protect vessels from excessive pressure. By the use of the control means described in this invention, undue product loss through the valve seat by leakage (which is inherent in the conventional safety valve) is reduced and simmer is eliminated.

The control means will permit the spread between operating and set pressure to be closer than is practical when using a conventional spring loaded valve. By the use of this invention on conventional pressure relieving devices, a lower pressure rated vessel can be used at a substantial saving in cost.

This invention is an improvement over U.S. Pat. No. 3,229,713 granted to the applicant. The above patent describes a partially bent toggle between the control spring and the output member. The toggle linkage requires three pivoted joints which can be subject to galling or binding. The freedom of movement of the links to rotate on the pins is dependent on for safe operation to relieve excess pressure from the vessel.

This invention utilizes only one pivoted link thereby reduce the possibility of galling or binding by two-thirds and increase the safety factor three folds.

The toggle arrangement shown in U.S. Pat. No. 3,229,713 and the single link described in this invention performs in exactly the same manner.

The control means is applicable to an indirect or direct spring loaded pressure relief valve.

"Fail safe" features have been incorporated in this device. In the event that pressure in the vessel fails to be present in the cylinder, the design permits the piston to recede in a space provided in the bore of the cylinder, offering no mechanical restriction on the closure member to open by the pressure in the vessel.

Should the piston jam in the cylinder the vertical sliding rods move against the control spring as the piston is not affixed to the rollers or the rods.

The set pressure is limited by various pressure vessel codes to not exceed the maximum allowable working pressure of the vessel. To increase the 10 percent spread, the valve would require a higher set pressure in which case the design pressure value of the vessel would in turn be higher and more costly.

When the control means is used on an indirect spring loaded valve all the pressure retaining force on a valve disk is furnished by the control means. This pressure retaining force is obtained from an actuator being pressurized by vessel pressure and through mechanical means described in this invention compresses a control spring progressively which in turn loads the valve disk as the vessel pressure approaches the set pressure and at a predetermined pressure value releasing the resultant force from the control means on the valve disk resulting in the valve automatically discharging its full rated capacity.

The effective area of the actuator over the seat area of the valve predicates the percentage of net seat loading. Should the seat area equal 100 percent and the area of the actuator equal 125 percent, the net seat loading would be 25 percent when the set pressure is reached as the pressure under the disk cancels out 100 percent of the 125 percent in the actuator and control spring. This spread would insure a tight valve. Operating pressure to 97 percent of the set pressure or 3 percent spread is practical.

The opening action would be similar to the bursting of a rupture disk. It can be used on vessels where the blow-down to zero pressure in the vessel is tolerable. A manual reset means would permit the vessel to get back on stream immediately.

It can also be used as a dump valve in conjunction as a pressure relief valve by incorporating a three way valve in the tubing supplying the vessel pressure to the actuator. The three way valve is used to close the vessel pressure to the actuator and the venting of same. With no pressure in the actuator, the vessel pressure would lift the disk off the valve seat discharging the pressure in the vessel.

The control means can also be used on a direct spring loaded pressure relief valve furnishing a supplemental force on the valve disk. The conventional spring loaded valve furnishes a static spring force of 100 percent on the valve disk. When operating at 90 percent of the set pressure (equal to 100 percent), the net spring force on the valve disk is only 10 percent which is not sufficient to insure a tight valve.

The control means in this instance would furnish a supplemental force on the valve stem which engages the valve disk to assist the net spring force and at a predetermined pressure value (set pressure) release this force on the valve stem, returning the control to the spring in the valve.

The percentage of supplemental force developed by the control means to assist the valve spring is governed by the area of the actuator over the seat area of the valve. The control means when used on this type of valve will provide an effective wider spread up to the set pressure. This will permit the use of a lower pressure design vessel at a substantial saving in cost over a heavier vessel required to obtain the same end results using a conventional spring loaded valve.

Simmer (a stage prior to opening) which is inherent in spring loaded valves is eliminated by the fact that when the control means releases the supplement force on the valve stem, the valve will open instantly at its normal set pressure.

To accomplish the above mentioned results I employ energy from a pressure responding element and mechanical means described here-in so that as the pressure in the vessel increases the control means transmit an increasing pressure retaining force on the valve disk up to the set pressure at which point this force is released returning the control to the valve.

The control means consists of a housing enclosing and aligning axially a slidable upper rod having a shoulder on one end resting on the top side of the housing, an initially slanted link having one end pivoted to the other end of the upper rod, a set of rollers operatively affixed to the free end of the link, a lower slidable rod or output member axially aligned with the upper rod, a set of lower rollers operatively affixed to the top end of a lower rod, the upper circumference of the lower rollers initially engaging the lower circumference of the upper rollers tangential to axis of the lower rod, the other end of the lower rod operatively engaging the valve disk a cooperative piston means positioned axially right angle to the axis of the lower rod in a manner to operatively engaging the circumference of the upper rollers, a compression spring having one end axially engaging the shoulder of the upper rod, the other end of the spring engaging a compression screw threaded in the top closed end of a spring cover which is axially secured to the housing and a conduit to transmit the vessel pressure to the piston.

As pressure in the vessel approaches the set pressure, the piston means pushes the upper rollers toward the center line which increases the vertical distance between the initial center points of both sets of rollers, this action raises the shoulder of the upper rod from the housing which in turn further compresses the spring. The spring force now is transmitted to the lower rod and operatively to the valve disk.

At a predetermined pressure in the vessel, the spring can no longer restrain the force from the piston on the upper rollers at which point the upper rollers are pushed over the apex of the lower rollers and passes the center line thus releasing the force from the spring on the output member, returning the control to the valve.

The control means is manually reset by means that pushes the upper rollers to their original position thus engaging the piston means. Opposing piston means will permit the control means to function by utilizing either piston means by the use of valves in the conduit line to pressurizing one cylinder and venting the other cylinder as the control means is symmetrical in design. This arrangement eliminates the manual reset required for a single piston means.

FIG. 1 of the accompanying drawings is a vertical central section of an indirect spring loaded valve incorporating the control means of this invention.

FIG. 3 shows the control means with the front cover removed.

FIG. 4 shows a vertical central section of a direct spring loaded valve incorporating a main valve spring positioned axially between the control means and the valve disk. The resultant force from the control means is transmitted to the disk by engaging the valve stem.

FIG. 5 shows a vertical central section where the resultant force from the control means engages the compression spring of a direct spring loaded valve instead of the valve stem. Should the piston and/or pivoted link joint or sliding rods jam, the valve will open in as much as the valve stem is not mechanically in contact with the output member.

Figure 1:
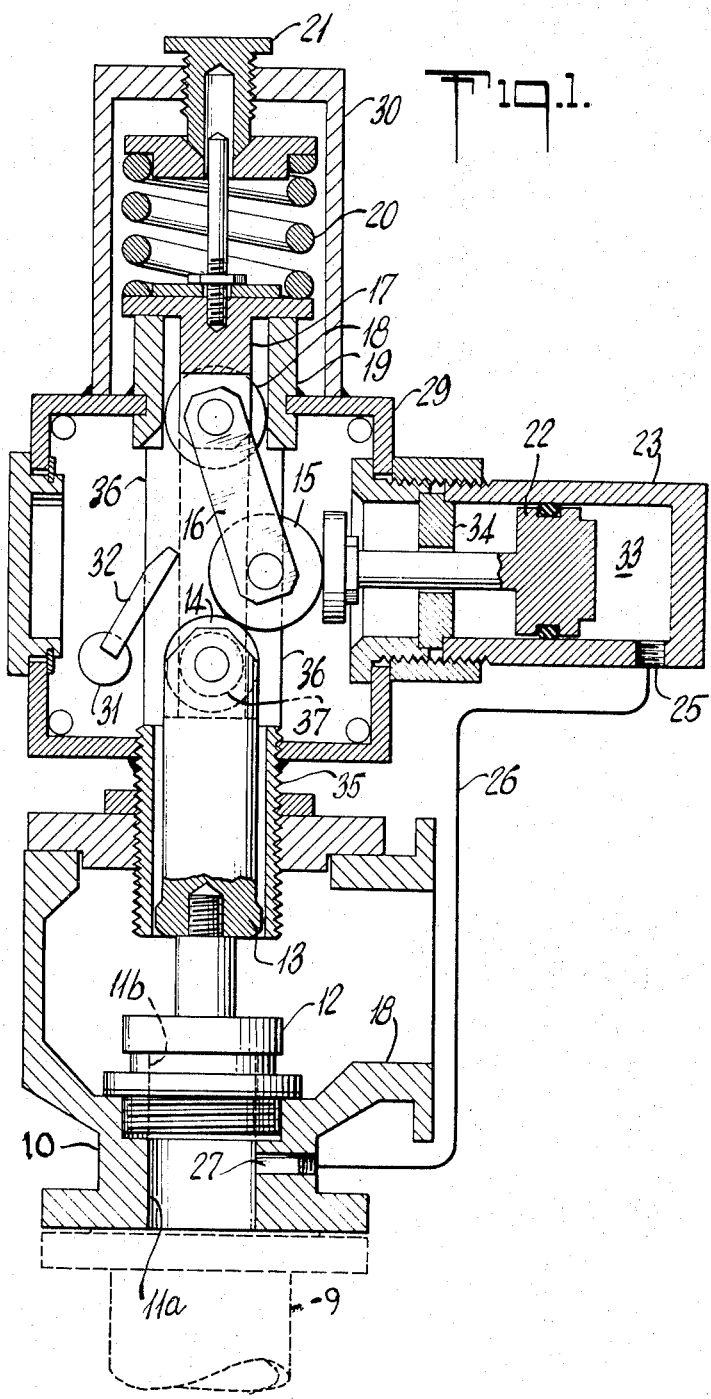

Referring to FIG. 1 the numeral 9 is a flanged outlet nozzle integral to a pressure vessel on which a valve body 10 is attached. Passageway 11a is normally dead ended by a closure member 12 engaging seat bushing 11b. The discharge outlet 18 of valve body 10 directs the flow of the fluid to atmosphere or to the flare system when the closure member 12 is not in contact with the seat bushing 11b. A lower rod or output member 13 is positioned axially to the seat bushing 11b. The closure member 12 is axially engaging the bottom end of the output member 13. A pair of lower rollers 14 are operatively affixed to the top end of the output member 13 in a manner so that the upper half of the circumference extends beyond the end of output member 13.

A pair of upper rollers 15 are operatively affixed to one end of a link 16 which initially in a slanted position. The circumference of the upper rollers 16 initially engaging tangentially the circumference of the lower rollers 14. The center points of rollers 14 and 15 to line up initially at approximately 30° from the axis of the output member in the direction of the piston 22.

The upper end of the slanted link 16 is pivoted axially to one end of a slidable rod 17 which has incorporated a shoulder that rests on abutments 19. The bottom end of compression spring 20 rests axially on the top of the shoulder of rod 17 while the other end of said spring engages a compression screw 21 threaded axially in spring cover 30 and act as an abutment to the top end of spring 20.

The sliding rods 13 and 17, the rollers 14 and 15 and the slanted link 16 are housed within a casing 29. Spring 20 is enclosed axially by spring cover 30 which is secured to casing 29. The output member 13 is guided by nipple 35 projecting axially from the bottom side of casing 29.

The upper slidable rod 17 is guided by rollers 18 axially affixed to bottom end of the upper rod 17. Rollers 18 engaging the flat inside surfaces of abutments 19 which are secured to the top side of housing 29.

Figure 2A:
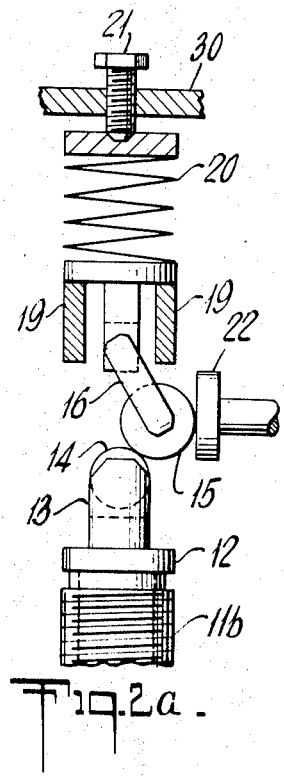
FIG. 2a and 2b are schematic drawings showing the initial and spent positions of the control means.
Figure 2B:
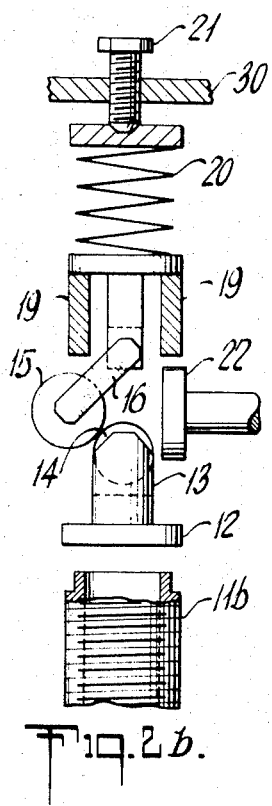

Cylinder 23 is secured to one side of housing 29. Piston 22 is initially positioned midway in the bore of cylinder 23. Piston stop 34 limits the stroke of piston 22 from extending too far into the casing 29 which would if not limited interfere with the lifting of the output member 13 and closure member 12 (FIG. 2b) when the valve is ready to open.

The dead end of cylinder 23 has an opening 25 from which conduit 26 transmits vessel pressure from pressure point 27 being either on the relief valve or the vessel being protected from overpressure.

Piston 22 operatively engages the circumference of the upper rollers 15 as pressure in the cylinder 23 approaches the set pressure thereby pushing the slanted link 16 toward a perpendicular position. This action increases the horizontal distance between the center points of rollers 14 and rollers 18 thereby raising the spring 20 off of its abutments 19.

The force in the spring 20 is now transmitted mechanically through the upper rod 17, link 16, upper rollers 15, bottom rollers 14, output member 13 and finally to the closure member 12 keeping the valve in a closed position.

When the set pressure or predetermined pressure is reached in the vessel, the piston 22 pushes the upper rollers 15 beyond the center line of rollers 14, thus releasing the force in spring 20 from the closure member 12. Pressure in the vessel will raise the closure member 12 permitting the discharge of the fluid through the outlet opening 18 in the valve. When the valve is in an open position, any initial force in spring 20 is now removed from closure member 12 by resting on abutments 19. The pressure/force of piston 22 is also removed from rollers 15 by limiting the piston stroke by piston stop 34.

The pressure/force from piston 22 is amplified to upper rod 17 as the slanted link 16 approaches a perpendicular position with increase in vessel pressure. The resultant force in upper rod 17 will increase at a greater rate than the spring rate of the spring 20. At a predetermined vessel pressure, the upper rollers 15 are pushed over the apex of the lower rollers 14 thus removing any force from the spring 20 on the closure member 12.

Cylinder bore space 33 permits the piston 22 to retract by the vessel pressure force under closure member 12 should the vessel pressure to the cylinder 23 be accidentally removed, thus provide a "fail safe" feature. In this instance the pressure will raise closure member 12 from seat bushing 11b as the slanted link 16 is now mechanically free to swing in the direction of piston 22. The vessel pressure can be intentionally removed from cylinder 23 making the valve operate both as an automatic pressure relief device and as a dump valve.

A manual reset will push rollers 15 over the apex of rollers 14 in a direction to engage piston 22. Shaft 31 is operatively positioned to rotate in cover plates 38. Flap 32 is secured right angle to the axis of shaft 31, one end projecting beyond cover plate 38 for wrench flats.

The pressure control means is symmetrical in design allowing the use of opposing cylinders. In this instance the manual reset shaft 31 and flap 32 are not required. The vessel pressure is connected to each cylinder by conduit 26. Proper valving will pressurize one cylinder while venting the other cylinder. The valves can be located remote from the valve for ease of operation. An indicator on the face of the cover plate 38 will show the position of rollers 15 in relation to the center line of the housing 29.

FIG. 3 shows the control device with the front cover removed to clarify the position of guide rails 36 and rollers 37.

FIG. 4 shows the valve body 10 and a compression spring 439 positioned axially between the closure member 12 and compression screw 441 threaded axially in the closed end of the valve bonnet 442.

Valve stem 440 is affixed at one end to closure member 12 and the other end axially guided by a bore in compression screw 441. The stem 440 to project above compression screw 441 engaging output member 13. The control means is attached to the bonnet 442 by adaptor sleeve 443.

In this instance the 100 percent of the pressure retaining force is furnished by the valve spring 439. The control means will furnish a supplemental force on the closure member 12 through the valve stem 440. At a predetermined pressure value the supplemental force is removed from the valve stem 440 returning the control to spring 439 in the valve.

Guide rails 36 secured to casing 29 provides flat raceways for rollers 37 to rise when the valve is in an open position. The guide rails 36 also takes the lateral force from piston 22 through rollers 14 and 15.

Cylinder 23 has a conduit connection 25 located in the closed end.

FIG. 5 shows a sectional view of the top portion of the valve as shown in FIG. 4. The difference in FIG. 5 is that the compression screw is made in two parts instead of one. The free end of the stem 440 does not engage the output member 13 nor project above the compression screw as shown in FIG. 4.

Compression screw 544 has a bore in which shouldered rod 545 is guided. The shoulder on rod 545 engages the annular surface of compression screw 544 and the top end of compression spring 439. The shouldered rod 545 projects above the bore in the compression screw 544 engaging the output member 13. Lock nuts 546 positioned on the projected portion of shouldered rod 545 will limit its stroke when the resultant force from output member exceeds the force in compression spring 439.

As the vessel pressure approaches the set pressure of the valve, the pressure/force of piston means 22 on the output member 13 will raise the normal set pressure of the valve by further compressing spring 439 up to the limit stop on rod 545. At a predetermined pressure in the vessel the control means will release the force of compression spring 20 on output member 13 thus returning the valve to its normal set pressure.

The free end of valve stem 440 is guided in the bore 548 in shouldered rod 545. The valve stem 440 is mechanically free to lift in space 548 as a "fail safe" feature should piston means 22 and/or slanted link 16 malfunction.

While I have described various embodiments of my invention, it will be understood that this invention may be embodied otherwise than shown and varies changes in detail and construction and arrangement of part may be made without departing from the underlying idea of my invention within the scope of the appended claims.

What is claimed is:

1. A pressure control valve for controlling the flow from a pressure vessel and adapted to release the pressure when a predetermined pressure is reached in said vessel to include a valve and a control means operatively attached to said valve, said control means comprising a compression spring initially under load positioned between abutments, a slidable upper rod having one end axially engaging said spring, a link initially in a slanted position pivoted to the other end of said upper rod, upper rollers pivoted to the free end of said link, lower rollers pivoted to one end of a slidable lower rod, a closure member in said valve operatively engaging the other end of said lower rod, the rims of said upper rollers initially engaging the rims of said lower roller tangential to the axis of said lower rod, a cooperative piston means responsive to pressure in said vessel and operatively engaging the rim of said upper rollers to urge said link toward the center line of said lower rod thereby raising the lower end of said spring from its abutment and in turn operatively load said closure member over a passageway in said valve and with further increase in pressure said piston means at a predetermined pressure will effect further movement of said link so that the center point of said upper rollers have passed the center point of said lower rollers returning the spring to its abutment and relieving the spring force imposed on said closure member and restoring the control to said valve.

2. A control means as claimed in claim 1 wherein a compression spring is interposed between the lower in i said control means and the closure member in the valve so as to apply additional closing force on said closure member.

3. A control means as claimed in claim 1 wherein piston means in said control means is initially positioned when under static conditions midway in a cylinder in said control means so as to offer reciprocal axial movement of said piston in said cylinder when under dynamic conditions.

4. A control means as claimed in claim 1 to include means for resetting said upper rollers in said control means into a position to operatively engage said cooperative piston means in said control means.

* * * * *